United States Patent [19]

Grantland

[11] Patent Number: 4,831,650
[45] Date of Patent: May 16, 1989

[54] ADAPTIVE TELEPHONE RECEIVE CONTROL

[75] Inventor: Gary Grantland, Hartselle, Ala.

[73] Assignee: Palco Telecom, Inc., Nashville, Tenn.

[21] Appl. No.: 194,101

[22] Filed: May 16, 1988

[51] Int. Cl.$^4$ .......................................... H04M 17/02
[52] U.S. Cl. .................... 379/143; 379/395; 379/145
[58] Field of Search ............... 379/143, 145, 390, 395

[56] References Cited

U.S. PATENT DOCUMENTS

| | | | |
|---|---|---|---|
| 3,627,950 | 12/1971 | Sand | 379/143 |
| 3,760,101 | 9/1973 | Burns | 379/143 |
| 3,952,160 | 4/1976 | Pasternack et al. | 379/145 |
| 4,024,346 | 5/1977 | McDermott | 379/395 |
| 4,087,647 | 2/1978 | Embree et al. | 379/395 |
| 4,385,207 | 5/1983 | Munson | 379/390 |
| 4,718,083 | 1/1988 | Boeckmann | 379/392 |
| 4,756,022 | 7/1988 | Siligoni et al. | 379/395 |
| 4,759,054 | 7/1988 | Mellon | 379/145 |

*Primary Examiner*—Robert Lev
*Attorney, Agent, or Firm*—C. A. Phillips

[57] ABSTRACT

A paystation telephone level control system is disclosed including a telephone receiver driven by a local amplifier and wherein two sets of attenuating resistors, a coarse attenuation set and a fine attenuation set, interface with connectable terminals of a binary control crosspoint switch. The presence or absence of coin tones and dialing tones are detected and the crosspoint switch discretely controlled by their presence to effect discrete levels of attenuation of signals fed to the receiver. In addition, the lever of attenuation during voice communications is a function of a pre-adjusted attenuation and a user selection.

14 Claims, 2 Drawing Sheets

ADAPTIVE TELEPHONE RECEIVE CONTROL

FIELD OF THE INVENTION

This invention relates generally to paystation telephones and more particularly to the regulation of signal levels provided a telephone receiver by which a user hears what appears on a telephone line.

BACKGROUND OF THE INVENTION

One problem particularly involved in paystation telephone operation has been that of acoustic isolation between the transmitter and receiver, this being necessary for the prevention of the receiver being used as a transmitter during periods when the transmitter is disabled for control purposes. One method of dealing with this problem has been the inclusion of an isolation amplifier separating the two, this amplifier being connected between the transmission network receiver output and the handset receiver.

A further problem has been that of preventing a user from recording tones generated in response to the insertion of discrete denominations of coins with respect to which the recording might later be used to make calls without payment.

Another problem has been that of reducing, to below annoying levels, the level in the receiver of dialing tones used in many telephone systems.

Still another problem has been that of conveniently and effectively providing appropriate communication or voice sound levels for paystation users having hearing defects. Presently, and in recognition of this problem, some paystation phones have been equipped with induction coils for direct coupling to hearing aids. However, not all hard of hearing customers have hearing aids. To meet this problem, some paystations have been equipped with separate dedicated amplifiers to provide a boost of acoustic output.

In recognition of the foregoing, it is the object of this invention to provide an improved level control which deals with all of the level requirements present in a single signal level control system.

SUMMARY OF THE INVENTION

In accordance with this invention, an receiver amplifier is employed with a fixed gain, but there is connected in circuit with it a digitally controlled crosspoint switch which selects an attenuation factor from between a group of input attenuators and a group of output attenuators, the selection being a function of the sensed mode of operation and discrete user demand for increased or decreased signal level.

DESCRIPTION OF THE PREFERRED EMBODIMENT

Figure 1:
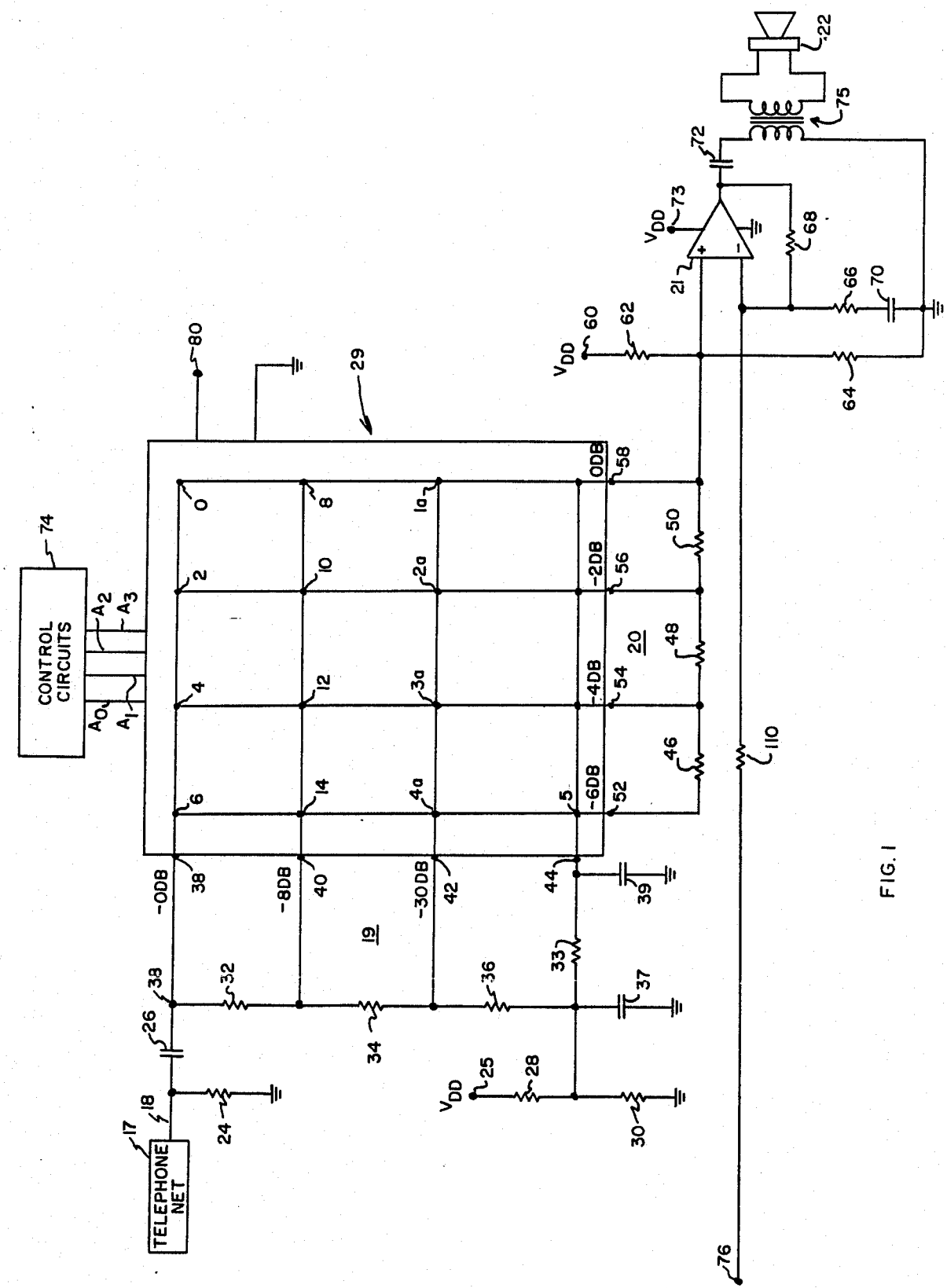
FIG. 1 is a schematic diagram of the overall system of the present invention.

As seen in FIG. 1, a transmission network illustrated by block 17 provides an electrical signal on lead 18 which is connected through a first or input attenuator network 19, crosspoint switch 29, a second or output attenuator network 20, and an operational amplifier 21 to telephone receiver 22 in a telephone handset.

Input circuitry includes a resistor 24 connected between an input lead 18 and ground, which resistor provides a load impedance for the transmission network output 17 and which would have been normally matched to the telephone receiver impedance. Coupling capacitor 26 couples audible signals from network 17 to input terminal 38 of crosspoint switch 29 and across input attenuation network 19, network 19 being formed of a logrythimic voltage divider comprising resistors 32, 34, and 36, connected in series between terminal 38 and ground through capacitor 37. Of these resistors, resistor 32 is connected across input terminals 38 and 40 of crosspoint switch 29, resistor 34 is connected across terminals 40 and 42, and resistor 36 is connected between terminal 42 and A.C. ground through capacitor 37. The values of these resistors are chosen to effect logrythimic, in terms of dB, coarse, value attenuations shown in FIG. 1. Capacitor 39 is connected between terminal 44 of switch 29 and ground and provides a direct A.C. signal ground at terminal 44.

Attenuator output network 20 includes series connected resistors 46, 48, and 50. Resistor 46 is connected across terminals 52 and 54 of crosspoints switch 29, resistor 48 is connected across terminals 54 and 56, and resistor 50 is connected across terminals 56 and 58. The values of these resistors are, again, logrythimically related to effect attenuations as shown at discrete terminals in FIG. 1, in this case, providing fine attenuations.

Crosspoint switch 29, for example, a digitally controlled type CD-22100, is powered by a D.C. source connected between terminal 80 and ground. By means of externally generated binary signals, it provides the capability of connecting any one of the input terminals 38, 40, 42, or 44 with any one of output terminals 52, 54, 56, and 58. Thus, the combination of the input and output attenuators placed in circuit thereby provides an attenuated level output which is the sum of the indicated attenuations, depending upon the switch point operated by crosspoint switch 29. Discrete switches are at the switch points indicated by dots at intersections of vertical and horizontal lead lines from the input and output terminals shown, and those used are numerically designated.

Operating bias levels are provided to crosspoint switch 29 and the following operational amplifier 21 by the application of like reference voltages $V_{DD}$ at terminals 25 and 60 and from across a first voltage divider formed by resistors 28 and 30 and a second voltage divider formed by resistors 62 and 64, application being from the first voltage divider through resistor 33 to terminal 44 of switch 29 and from the second voltage divider to terminal 58 of switch 29. Bias from the second voltage divider is also connected through resistor 62 and across resistor 64, connected to ground, to the non-inverting input of operational amplifier 21.

Operational amplifier 21 amplifies the output signal from crosspoint switch 29, which signal is applied to the non-inverting input of amplifier 21 from terminal 58 of crosspoint switch 29. The amplifier input signal appears across resistor 64. Resistor 68 is connected between the output of operational amplifier 21 and the inverting input, and resistor 66 is connected from the inverting input to ground through capacitor 70, and this combination conventionally sets the gain of operational amplifier 21, for example, at a figure of 12 dB. General D.C. bias for operational amplifier 21 is provided between terminal 73 and ground. The output of operational amplifier 21 is fed through capacitor 72 and across the input winding of impedance matching transformer 75, the output winding of the latter being coupled to, and providing an output to, receiver 22, located in a handset (not shown).

An address system illustrated by control circuit 74 is provided to select the desired crosspoint connection of the attenuator inputs and outputs of crosspoint switch 29 in order to provide a selected attenuation of a signal passing between network 17 and receiver 22. It selectively provides, as illustrated FIG. 2, a series of four-bit binary addresses on lines A0–A3 which can address up to 16 switches, as needed. Typically, while addressed switches of the crosspoint switch can be selectively closed or opened depending upon a data input level, in the present case, addressed switches are always operated closed, as by a constant data voltage level, and thus no data input is shown. Further, since whatever appears on the binary input lines A0–A3 is to be always used, there is no requirement that a separate latch input be provided to the switch, and none is shown in the illustration.

In the operation of crosspoint switch 29, one of its 16 switches would be operated closed, depending upon the addressed switch, and thus a discrete coupling path is provided between the input and output of the attenuators. The ultimate signal level between the circuit input as it appears at lead 18 and output to receiver 22 is both a function of the attenuators as set by switches of crosspoint switch 29 and the gain of operational amplifier 21 which, as stated, in the present example, is set to provide a +12 dB of gain. Considering the indicated attenuations at input and output terminals of crosspoint switch 29 and thus a possible 36 dB of attenuation, the total range of level change from input to output is from −24 dB to +12 dB. There is, however, a setting of crosspoint switch 29, with switch 5 closed, where the input is effectively grounded through capacitor 39, connected between input point 44 and ground. Thus, this additional switch point provides for a complete muting level of the system.

In the present embodiment of this invention, attenuation is differently controlled during three operational conditions or modes. In their sequence of occurrence, the first one is the appearance on network 17 of distinctive tones which are generated in the network as a result of the deposit of coins in the pay telephone with which the present circuit is integrated. As discussed above, in this first mode, it is important that all sound be muted, and therefore, an arrangement is provided for the closing of switch 5 as described. The second mode occurs during tone or DTMF dialing which, desirably, from the point of view of the user, should not be of an annoying level in receiver 22. The third mode occurs after the operation of the first two, when normal voice communications are enabled by network 17, and as a particular feature of this invention, means are provided for the user to select an amplification level.

Figure 2:
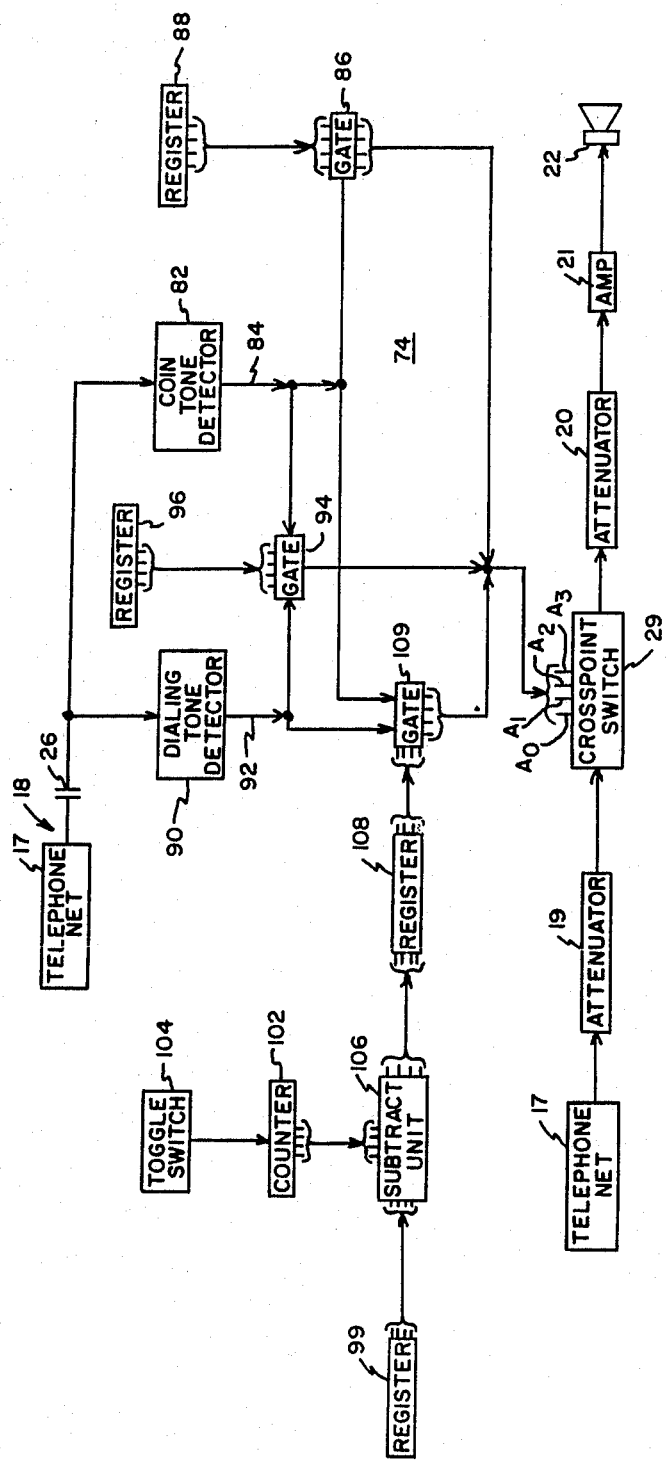
FIG. 2 is a block diagram of a telephone circuit including a control assembly for control of the system shown in FIG. 1.

FIG. 2 illustrates in block diagram form an arrangement for providing the control of crosspoint switch 29 for the three modes of operation, and with respect to two of them, dialing tone mode and communications mode, for enabling attenuation adjustments to overcome variations in gain levels encountered in manufacturing, or as a matter of customer preference.

Referring to FIG. 2, the operational state appearing on network 17 is provided on lead 18. During the occurrence of coin tones, these are detected by a coin tone detector, or decoder, 82 which provides a discrete signal level on lead 84 which can be employed as a gating or inhibiting signal. It is provided as a gating signal to gate 86. Gate 86 furnishes the digital output of register 88 to crosspoint switch 29. This register has stored in it the binary equivalent of the numeral 5 which, as described above, will effect operation of crosspoint switch 29 to connect terminal 52 to A.C. ground through capacitor 39 and effect complete muting.

Subsequently, in operation, it is anticipated that dialing tones will be present on lead 18 and dialing tone detector or decoder 90 senses their appearance and provides a discrete gating of inhibiting signal on lead 92. This signal is provided as a gating signal to gate 94 which gates the binary contents of register 96 to crosspoint switch 29. Depending upon manufacturing tolerances or customer desire, digital register 96 is loaded with switch numbers 1a, 2a, 3a, and 4a. As will be noted in FIG. 1, when switch 1a is closed, there will be provided attenuation of 30 dB; when switch 2a is closed, 32 dB; when switch 3a is closed, 34 dB; and when switch 4a is closed, 36 dB. The overall result will be that the signal level transfer from lead 18 to receiver 22 will be an overall attenuation factor less than these amounts by the amplifier gain.

Finally, after dialing is completed and there are no longer coin or dialing tones on lead 18, the circuitry provides for the adjustment of overall circuit gain for a communications mode of operation. At this point, there are two considerations to be dealt with: the setting of a base or reference level of gain between network 17 and receiver 22 and a user's gain selection to increase the level from this reference level. Obviously, the maximum possible would be with all attenuation removed, enabling the full gain of amplifier 21 to be controlling, normally in this case, a possible increase of 12 dB. To accomplish this, a manufacturing adjustment would be provided for there to be an attenuation insertion of 12 dB, this being placed in register 99 by the insertion of the binary equivalent of 12. It is to be noted that for this mode of operation, as a convenience in explanation, the switch point numerals correspond to selected attenuations, in this case, involving switch points and attenuations 14, 12, and 10 (dB). Assuming that the amplifier actually provided a gain of 14 instead of 12 and it is desired to maintain as a reference the same 0 dB overall level change, there would be inserted in register 99 a reference 14 dB of attenuation during manufacture. Then, assuming that it is desired to enable a user to increase the gain by 12 dB, it is simply necessary that there be removable a total of 12 dB of attenuation. In practice, this would be accomplished in 2 dB steps, thus by incrementally removing 2 dB of attenuation at a time, wherein, progressively, switches 12, 10, 8, 6, 4, 2, and 0 would be operated.

As shown in FIG. 2, one way of accomplishing this is by incrementing a counter 102 as by a toggle switch 104, which increments counter 102 twice each time the switch is operated, in response to the leading and trailing edge of a switched voltage. Thus, if switch 104 is operated once, counter 102 would register in binary form the numeral 2. This is fed to digital subtraction unit 106 which would subtract 2 from the inserted manufacturing attenuation figure of 12 or 14 in register 99, as the case may be, to thereby remove 2 dB of attenuation and increase gain by 2 dB. Similarly, if more gain is desired, the user would repeat operation of switch 102 up to, for example, a maximum of six times to remove attenuation of 12 dB. Of course, if amplifier 21 should provide a lesser amplification than 12 dB, then assuming that a 0 dB overall reference level was to be maintained, the level could only be raised to the extent of the amplifier gain, thus calling for a lesser number of possible steps of removal of attenuation. The binary output of subtraction unit 106 is stored in register 108.

In order to effect recycling of operation after a maximum gain point is reached, counter 102 may be a ring counter which recycles back to zero after having been incremented to a maximum effective count.

An alternate mode of achieving an attenuation reduction count would be via an A/D converter which might be operated from a bias source and volume control type variable resistor. Thus, the user would simply turn a knob to effect an attenuation and subtraction number applied to subtraction unit 106. In any event, the output of subtraction unit 106 is stored in register 108 and absent an inhibiting signal applied to gate 109, the binary value of register 108 is provided as an input to crosspoint switch 29 to operate a like identified switch to effect the indicated attenuation as described.

As a simple means of ensuring progressively that, first, only coin tone signals would be effective, then only the dialing tone coins, and finally only the output of subtraction unit 106, the output signal on lead 84 of coin tone detector 82 has the effect of an inhibiting signal to gates 94 and 109 and block binary signals through these gates, and the output on lead 92 from dialing tone detector 90 is fed as an inhibition signal to gate 109.

As provided, and as a matter of convenience, only the switch positions used are labeled with a numeral, and the balance of the 16 switches are unused and unlabeled.

As a supplemental feature, illustrated in FIG. 1, auxiliary input 76 is provided, it being connected to the inverting input of operational amplifier 21 through resistor 110. It enables audio tones not transmitted from telephone network 17 to be passed to operational amplifier 21 for use as confirmation or pacifier tones.

While the applicant has illustrated in terms of discrete hardware assemblies or subassemblies an arrangement for accomplishing the multiple attenuation system of the invention, it is to be appreciated that a general purpose or special purpose computer, or microprocessor, may be programmed and thus be configured to perform the functions which have been indicated herein. The significant matter is that the applicant has determined a new multiple mode level control system for a pay telephone which is automatically responsive to the different modes of operation of the telephone to provide optimum adjustment of certain signal levels and yet also provides for a readily adjustable means of control of gain for the hearing impaired.

I claim:
1. A pay telephone system comprising:
   a telephone signal circuit having an electrical output;
   a telephone receiver having an electrical input and an acoustical output;
   an amplifier having at least one signal input and an output, said output coupled to said electrical input of said telephone receiver;
   a binary controlled crosspoint switch having a first set of electrical terminals, a second set of electrical terminals, and switching means responsive to binary input signals for selectively interconnecting one of said first set of terminals to one of said second set of terminals as a function of a binary input number; and
   attenuation means for placing selected attenuation in circuit between said electrical output of said signal circuit and said receiver comprising:
      first attenuation means coupled in circuit with said electrical output and said first set of electrical terminals for effecting a discrete factor of attenuation of signals at each said terminal of said first set of terminals, and
      second attenuation means coupled between said second set of terminals and to said signal input of said amplifier for effecting a discrete factor of attenuation at a discrete one of said second set of terminals;
   condition sensing means responsive to the signal state of signals present in said electrical output of said signal circuit for providing a plurality of discrete outputs as functions of said last-named signals; and
   a control system responsive to selected discrete outputs of said condition sensing means for providing a discrete binary input signal to said crosspoint switch for selectively effecting the switching of said input terminals to said output terminals and thereby effecting a selected change in level between said electrical output of said signal circuit and said telephone receiver.

2. A system as set forth in claim 1 wherein said first attenuation means comprises a plurality of resistors connected in series and coupled across said first set of terminals and coupled across said electrical output of said signal circuit, and said second attenuation means comprises a plurality of resistors connected in series and coupled across said second set of terminals.

3. A system as set forth in claim 2 wherein said first set of terminals comprises at least four terminals, and said second set of terminals comprises at least four terminals, and the values of said resistors are all logrhythmically related, whereby decibel (dB) factors of attenuation are achieved and related.

4. A system as set forth in claim 2 wherein said resistors are logrhythmically related, whereby attenuations are logrhythmically related.

5. A system as set forth in claim 2 wherein one of said signal states of said electrical output of said signal circuit is the presence of coin tones.

6. A system as set forth in claim 5 wherein one of said signal states is the presence of dialing tones.

7. A system as set forth in claim 6 wherein one of said signal states is the absence of either coin tones or dialing tones.

8. A system as set forth in claim 7 wherein said control system comprises means for storing a plurality of binary signals, each being a function of a desired discrete level of attenuation of a said electrical signal.

9. A system as set forth in claim 8 wherein one of said stored binary signals is representative of maximum attenuation of said electrical output and is responsive to at least one coin tone.

10. A system as set forth in claim 9 wherein one of said stored signals is representative of an intermediate level of attenuation of a said electrical output and is responsive to at least one dialing tone.

11. A system as set forth in claim 10 wherein:
   said control system includes adjustment means for providing adjustable selection of a said binary input to said crosspoint switch which is representative of a lower factor of attenuation than said intermediate level of attenuation.

12. A system as set forth in claim 11 wherein said adjustment means includes a hand-operated adjustment means for providing a binary factor of attenuation and a stored binary factor of attenuation, and said lower factor of attenuation being the difference between said last-named factors of attenuation.

13. A pay telephone system comprising:
   a telephone signal circuit having an electrical output;
   a telephone receiver having an electrical input and an acoustical output;
   an amplifier having at least one signal input and an output;
   a binary controlled crosspoint switch having a first set of electrical terminals, a second set of electrical terminals, and switching means responsive to binary input signals for selectively interconnecting one of said first set of terminals to one of said second set of terminals as a function of a binary input number; and
   attenuation means for placing selected attenuation in circuit between said electrical output of said signal circuit and said receiver comprising:
      first attenuation means including an attenuation input for effecting a discrete factor of attenuation of signals at each said terminal of said first set of terminals, and
      second attenuation means coupled between said second set of terminals and to said attenuation output for effecting a discrete factor of attenuation at said attenuation output;
   said amplifier, crosspoint switch, and attenuation means being serially coupled between said electrical output of said telephone signal circuit and said input of said receiver;
   condition sensing means responsive to the signal state of signals present in said electrical output of said signal circuit, alternately including voice signals, coin tone signals, and dialing tone signals, for providing a plurality of discrete outputs as functions of said last-named signals; and
   a control system responsive to selected discrete outputs of said condition sensing means for providing a discrete binary signal to said crosspoint switch for selectively effecting the switching of a said input terminal to a said output terminal and thereby effecting a selected change in level between said electrical output of said signal circuit and said telephone receiver.

14. A system as set forth in claim 13 wherein said first amplifier is coupled between said second attenuation means and said receiver.

* * * * *